United States Patent
Graham (10) Patent No.: US 7,286,904 B2
(45) Date of Patent: Oct. 23, 2007

(54) SYSTEMS AND METHODS FOR ADAPTATION TO WIRELESS REMOTE CONTROL OF IRRIGATION VALVES FROM EXISTING HARDWIRED CONTROL DEVICES

(75) Inventor: Glen Gary Graham, Riverside, CA (US)

(73) Assignee: NPD Corp., Riverside, CA (US)

( * ) Notice: Subject to any disclaimer, the term of this patent is extended or adjusted under 35 U.S.C. 154(b) by 84 days.

(21) Appl. No.: 11/209,590

(22) Filed: Aug. 22, 2005

(65) Prior Publication Data

US 2006/0043208 A1   Mar. 2, 2006

Related U.S. Application Data

(60) Provisional application No. 60/603,432, filed on Aug. 21, 2004.

(51) Int. Cl.
*G06F 19/00* (2006.01)
*G08C 17/02* (2006.01)

(52) U.S. Cl. .................. 700/284; 340/825.69; 239/64; 137/78.3

(58) Field of Classification Search ................ 700/283, 700/284; 340/539.1, 601, 602, 825.69; 239/63, 64, 69; 137/78.3
See application file for complete search history.

(56) References Cited

U.S. PATENT DOCUMENTS

| | | | |
|---|---|---|---|
| 3,726,477 A | 4/1973 | Shapiro | |
| 4,256,133 A | 3/1981 | Coward et al. | |
| 4,333,490 A | 6/1982 | Enter, Sr. | |
| 4,396,149 A | 8/1983 | Hirsch | |
| 4,760,547 A | 7/1988 | Duxbury | |
| 4,852,802 A | 8/1989 | Iggulden et al. | |
| 4,962,522 A | 10/1990 | Marian | |
| 5,074,468 A | 12/1991 | Yamamoto et al. | |
| 5,333,785 A | 8/1994 | Dodds et al. | |
| 5,445,178 A | 8/1995 | Feuer | |
| 5,465,904 A | 11/1995 | Vaello | |
| 5,479,338 A | 12/1995 | Ericksen et al. | |
| 5,647,388 A | 7/1997 | Butler, Jr. et al. | |
| 5,696,671 A | 12/1997 | Oliver | |
| 5,740,031 A | 4/1998 | Gagnon | |
| 5,749,521 A | 5/1998 | Lattery | |
| 5,760,706 A | 6/1998 | Kiss | |
| 5,870,302 A | 2/1999 | Oliver | |
| 5,927,603 A | 7/1999 | McNabb | |

(Continued)

*Primary Examiner*—Leo Picard
*Assistant Examiner*—Douglas S Lee
(74) *Attorney, Agent, or Firm*—Knobbe, Martens, Olson & Bear, LLP (57) ABSTRACT

A low cost system and method for retrofitting an existing control device to communicate wirelessly with one or more water-flow devices is provided. For example, an existing wired irrigation system may be adapted to allow wireless communication between a commercially available irrigation controller and commercially available water-flow devices, such as sprinkler valves. A wireless irrigation adapter receives control signals from an existing irrigation controller and transmits a wireless representation of the control signals. Water-flow devices may be coupled to one or more wireless receivers that receive the wireless representation of the control signals and operate the water-flow device(s) accordingly. The wireless irrigation receiver(s) listen(s) for the wireless control signals occasionally, thus reducing power consumption by the wireless receiver(s). This system and method may also wirelessly adapt control devices to irrigation that may never have been intended for that purpose when they were fabricated.

6 Claims, 6 Drawing Sheets

U.S. PATENT DOCUMENTS

| | | |
|---|---|---|
| 6,257,264 B1 | 7/2001 | Sturman et al. |
| 6,312,191 B1 | 11/2001 | Rosenfeld |
| 6,335,855 B1 * | 1/2002 | Alexanian et al. .......... 361/179 |
| 6,452,499 B1 | 9/2002 | Runge et al. |
| 2002/0092926 A1 | 7/2002 | Thornton |
| 2003/0109964 A1 | 6/2003 | Addink et al. |
| 2004/0089346 A1 | 5/2004 | Sutardja |
| 2005/0098649 A1 | 5/2005 | Thornton |
| 2005/0137752 A1 | 6/2005 | Alvarez |

* cited by examiner

SYSTEMS AND METHODS FOR ADAPTATION TO WIRELESS REMOTE CONTROL OF IRRIGATION VALVES FROM EXISTING HARDWIRED CONTROL DEVICES

CROSS-REFERENCE TO RELATED APPLICATIONS

This application claims priority under 35 U.S.C. § 119(e) to U.S. Provisional Application Ser. No. 60/603,432 filed on Aug. 21, 2004, which is hereby expressly incorporated by reference in its entirety.

BACKGROUND OF THE INVENTION

1. Field of the Invention

This invention relates to systems and methods for controlling automated irrigation systems and, more particularly, to systems and methods for retrofitting existing irrigation systems for wireless communication and providing low power wireless communication devices.

2. Description of the Related Art

A typical irrigation system comprises an irrigation controller, which include some timing and scheduling functionality, which is hardwired to one or more irrigation valves that are configured to control flow of fluid through the valves based on signals received from the irrigation controller. In these irrigation systems, in order to be able to control a newly installed irrigation valve, wires must physically be run from the irrigation controller to the new irrigation valve. As those of skill in the art will recognize, the connecting wires are typically buried in an underground trench and may be encased in additional protective material, such as PVC piping, for example. Thus, depending on the land features between the irrigation controller and the irrigation valves, placement of the wires may require considerable labor and expense.

One alternative to the use of an irrigation system having physical wires between the irrigation controller and the valves is the replacement of the wired irrigation system with a smart irrigation system, including a smart irrigation controller having built-in wireless communication capabilities. However, after replacing a wired irrigation controller with a smart irrigation controller, the irrigation valves must also be replaced with smart irrigation valves having built-in wireless communication capabilities in order to communicate with the replaced smart irrigation controller. In some cases, each of the smart irrigation valves comprise a timing module configured to determine and monitor the irrigation duration of the smart irrigation valve. Thus, a schedule may be wirelessly sent to the smart irrigation valve and the timing module may activate the smart irrigation valve according to the received schedule. As those of skill in the art will recognize, however, implementation of a timing module in smart irrigation valves requires some computing capabilities in the smart irrigation valve and, thus, the irrigation valve may require more power than a typical wired irrigation valve. In addition, in order to implement one of these smart irrigation systems into an existing system, the irrigation controller must be replaced with a smart irrigation controller having built-in wireless capabilities and, in order to communicate with the smart irrigation controller, the irrigation valves need to be replaced with smart irrigation valves having built-in wireless capabilities. Accordingly, currently available systems for implementing a wireless irrigation system require complete replacement of existing components and, thus, require significant expense. Systems and methods for allowing existing irrigation systems to be upgraded to communicate wirelessly are desired. More particularly, systems and methods for retrofitting existing irrigation controllers and irrigation valves so that wireless communications may be transmitted between the devices are desired.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other irrigation control systems.

In one embodiment, a low cost system and method for retrofitting an existing irrigation system to communication wirelessly is provided. For example, an existing wired irrigation system may be adapted to allow wireless communication between a commercially available irrigation controller and commercially available water-flow devices (such as irrigation valves, including existing or newly acquired irrigation valves).

In one embodiment, a wireless adaptor system for use with an existing hard-wired irrigation system includes sprinkler valves with associated wires and a controller that outputs at least a first set of control signals on the wires so as to activate sprinkler valves connected to the wires. The adaptor system comprises a wireless transmitter that is coupled to one or more control wires of the hard-wired irrigation system such that the wireless transmitter receives the first set of control signals from the sprinkler controller and the wireless transmitter, in response to receiving the first set of control signals periodically sends a first wireless signal so as to enable a sprinkler valve, and a wireless receiver coupled to the sprinkler valve wherein the wireless receiver, in response to receiving the first wireless signal, activates the sprinkler valve and wherein the wireless receiver is adapted to de-activate the sprinkler valve if the first periodic wireless signal is not detected during a predetermined time interval to thereby reduce the likelihood of the sprinkler valve over-watering.

In another embodiment, a method of controlling an irrigation system comprising a sprinkler valve electrically coupled to a wireless receiver and an irrigation controller electrically coupled to a wireless adapter comprises periodically transmitting a control signal from the wireless adapter, the control signal being representative of a signal received from the irrigation controller indicating that the sprinkler valve should be activated, receiving the control signal at the wireless transmitter, in response to receiving the control signal, activating the sprinkler valve, and de-activating the sprinkler valve if the first signal is not detected during a predetermined time interval to thereby reduce the likelihood of the sprinkler valve over-watering.

In another embodiment, a wireless receiver coupled to a sprinkler valve comprises means for activating the sprinkler valve in response to receiving a periodic wireless control signal indicating a desired state of the sprinkler valve, and means for deactivating the sprinkler valve if the periodic wireless control signal is not again detected during a predetermined time interval after being initially received.

In another embodiment, a method of retrofitting a hard-wired irrigation system for wireless communication, wherein the hard-wired irrigation system comprises an irrigation controller that is adapted to be electrically coupled to a sprinkler valve by a physical wire, the irrigation controller being adapted to output control signals to the sprinkler valve via the physical wire, coupling a wireless adapter to outputs of the irrigation controller so that the wireless adapter receives the control signals, coupling a wireless receiver to the control wires of the sprinkler valve, inducing the wireless adapter to transmit a transformed version of the received control signals, wherein in response to receiving the transformed version of the control signal, the wireless receiver activates the sprinkler for a predetermined time period.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The term "module," as used herein, means, but is not limited to, a software or hardware component, such as a field programmable gate array (FPGA) or an application specific integrated circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The terms "irrigation valve" and "valve" are used herein interchangeably and should be interpreted to include any fluid controlling device configured to control passage of a fluid in response to a received electrical signal. In certain embodiments, each of the irrigation valves is coupled to one or more spray heads, rotors, drip systems, flood systems, ditches, gate valves, or other fluid delivery devices that are configured to deliver water to one or more watering zones associated with the respective valve. In one embodiment, an irrigation valve includes one or more electromagnetic coils, through which current passes, by various means, to enable or disable the flow of fluid through the valve.

Figure 1:
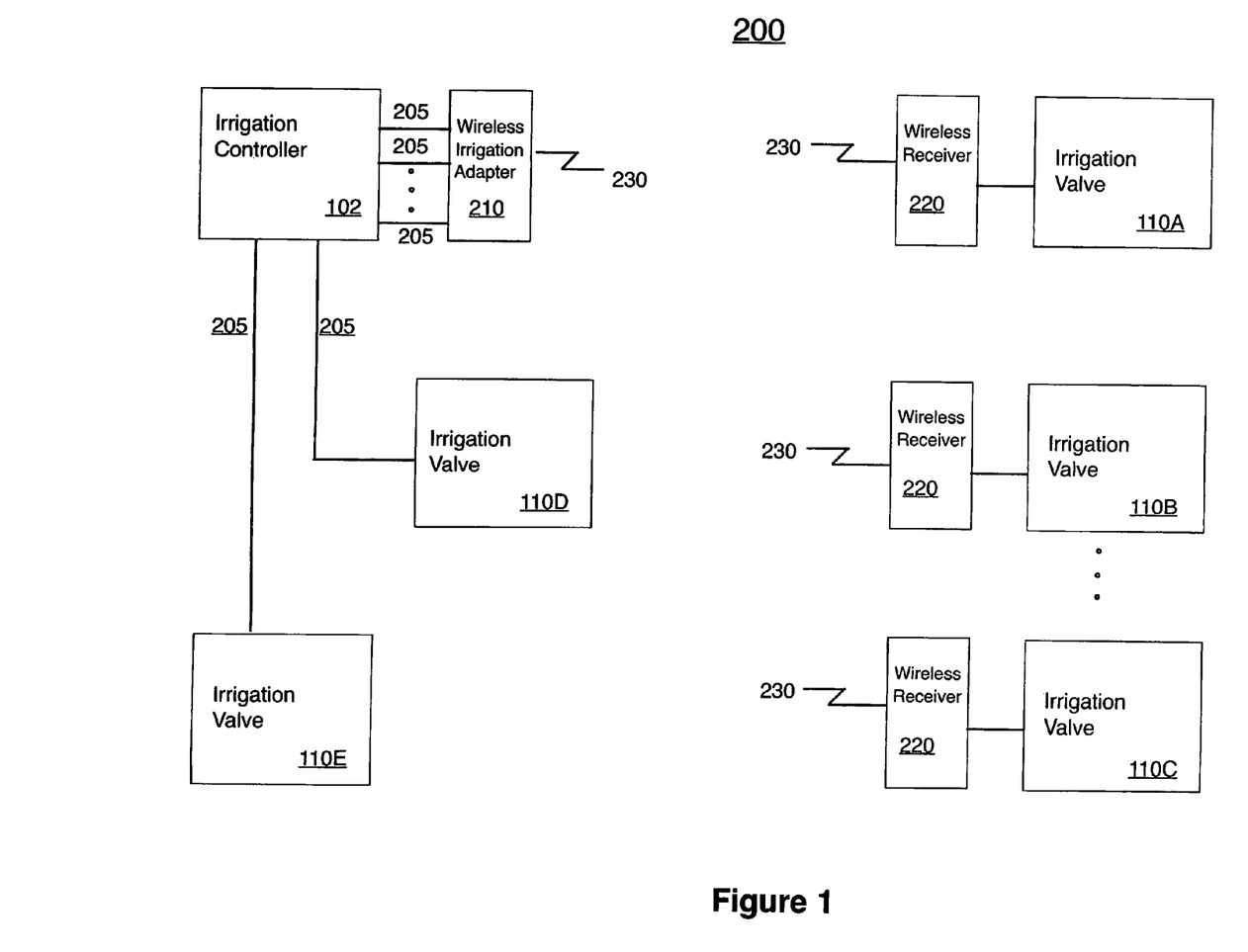
FIG. 1 is a block diagram of an irrigation system

FIG. 1 is a block diagram of an exemplary wireless irrigation system 200, including a wireless irrigation adapter 210 configured to interface a commercially available irrigation controller, such as the irrigation controller 102. As illustrated in FIG. 1, the exemplary wireless irrigation system 200 comprises the irrigation controller 102 and irrigation valves 110A, 110B, 110C, wherein communication between the irrigation controller 102 and the irrigation valves 110A, 110B, 110C is wireless, removing the need for physical wires between the devices. In the embodiment of FIG. 1, the irrigation controller 102 is also coupled to irrigation valves 110D, 110E in a conventional manner, i.e., with physical wires 205 extending from the irrigation controller 102 to the irrigation valves.

In one embodiment, the irrigation valves 110A, 110B, 110C are each electrically coupled to a wireless receiver 220, which are each configured to receive wireless communications from the wireless irrigation adapter 210. In other embodiments, a wireless receiver is coupled to control multiple irrigation valves. As explained in further detail below, the physical wires 205 from the irrigation controller 102 are coupled to the wireless irrigation adapter 210 that communicates wirelessly with the wireless receivers 220, rather than requiring the physical wires 205 to extend from the irrigation controller 102 to the irrigation valves 110.

In operation, the wireless irrigation adapter 210 receives control signals on wires 205 from the irrigation controller 102 that are intended for delivery to the irrigation valves 110 via wired connections. The wireless irrigation adapter 210 converts these control signals into signals that are suitable for wireless transmission. For example, the control signals may be converted to RF signals that may be transmitted from an antenna in, or electrically coupled to, the wireless irrigation adapter 210. In other embodiments, optical signals representing the control signals received on wires 205 are transmitted to an optical receiver by the wireless irrigation adapter 210.

In one embodiment, the irrigation controller 102 comprises a step-down transformer that supplies an activation signal to the irrigation valves 110. For example, many irrigation controllers include 24VAC step-down transformers. In one embodiment, one wire on the output-winding side of the step-down transformer may be used as a common wire (also referred to as a cold, return, or neutral wire). In this embodiment, a second wire on the output-winding side of the step-down transformer is the hot wire that supplies an electrical current. Thus, a load, such as a coil of one of the irrigation valves 110, that is placed between the common wire and the hot wire will be energized.

In one embodiment, each of the irrigation valves 110 comprises a solenoid that is configured to generate a force sufficient to open and close the valve 110 in response to the application of a 24VAC to the solenoid. For example, when a voltage, such as a 24VAC signal, is applied across a solenoid, the solenoid generates a magnetic field that causes a valve mechanism to move within the valve 110 and thereby allows water to flow through the valve 110. When the voltage is removed from the solenoid, the magnetic field may also be removed and the valve mechanism closes so that the water no longer flows through the valve 110. Those of skill in the art will recognize that other methods of wiring an irrigation controller 102 to multiple irrigation valves 110 and controlling operation of the valves 110 are well known in the art. The systems and methods described herein are not particular to any one configuration of irrigation system but, to the contrary, may be used with any known irrigation system.

The wireless irrigation adapter 210 transmits one or more wireless signals, which are referred to herein collectively as a wireless control signal 230 or a control signal 230, so that the wireless control signal 230 is received by the wireless receivers 220. In one embodiment, the wireless control signal 230 comprises a single, serial data transmission containing data intended for each of the wireless receivers 220. In another embodiment, the wireless control signal 230 comprises multiple data signals, such as at different frequencies, phases, or power levels, that are each intended for reception by one or more of the wireless receivers 220. In other embodiments, the control signal 230 comprises various combinations of wireless signals that are known in the art for point-to-multi-point communication. As described in further detail below with respect to FIG. 5, the wireless irrigation adapter 210 may be configured to periodically transmit the control signals 230 and the wireless receivers 220 may be configured to periodically receive the control signals 230. Accordingly, a total power used by the wireless irrigation system 200 may be significantly lower than a system that uses always-on wireless transmitters and receivers.

The wireless receivers 220 are configured to receive the transmitted wireless control signal 230 and transform the received control signal 230 in order to determine if respective irrigation valves 110 should be activated. The wireless receivers 220 are further configured to transform the received control signal 230 to an output signal that appropriately activates (opens the valve and allows fluid to pass through the valve) or deactivates (closes the valve, stopping fluid from passing through the valve) one or more irrigation valves according to the data contained in the control signal 230.

In one embodiment, the irrigation valves 110 that are controlled by the wireless receivers 220 each comprise one or more bistable, DC-latching solenoid valves. These DC-latching solenoid valves may advantageously be activated and deactivated by a forward or reverse bias DC pulse, respectively. In this embodiment, the wireless receivers 220 provide the appropriate DC current and polarity to the respective irrigation valve 110 in order to activate and deactivate the valve 110.

Advantageously, the addition of the wireless irrigation adapter 210 and the wireless receivers 220 do not require the replacement of the irrigation controller 102 or the irrigation valves 110. In one embodiment, however, AC solenoid valves are replaced with DC-latching solenoids in order to reduce power consumption by these irrigation valves. In an embodiment having valves 110 with DC-latching solenoids, the wireless receivers 220 may operate the valves 110 for extended periods. In one embodiment, DC-Latching solenoids only need power during switching on transitions between the activated and the deactivated states. Thus, the use of DC-latching solenoids may advantageously allow the valves 110 to be operated for longer time periods using less power, such as may be provided by a battery powered wireless receiver. In addition, the scheduling information in the irrigation controller 102 does not need to be reprogrammed in order to operate the irrigation valves 110 via the wireless control signal 230. Instead, the irrigation controller 102 continues to control the time periods during which the irrigation valves 110 are activated and deactivated. The wireless irrigation adapter and wireless receivers 220 provide a wireless link between the irrigation controller 102 and the irrigation valves 110.

Although discussion of the wireless irrigation system 200 herein describes half-duplex communication transmitted from the wireless irrigation adapter 210 to the wireless receiver 220, other embodiments may be full-duplex, wherein the wireless receiver 220 transmits feedback information to the wireless irrigation adapter. In addition, in some embodiment, wireless repeaters may be located between the wireless irrigation adapter 210 and the wireless receivers 220 in order to extend a communication range of the wireless irrigation system 200. Wireless repeaters are well known in the art. Any wireless repeater configured to receive and retransmit the control signal 230 may be used as a repeater in the embodiments described herein. Similarly, wireless repeaters may be utilized that are either half-duplex or full-duplex.

The irrigation controller 120 described herein refers not only to pre-existing irrigation controllers, but also includes those electronic devices, such as computing devices, that may be programmed to maintain irrigation schedules and output appropriate control signals. Because the inputs of the wireless irrigation adapter 120 may be set to accept any DC or AC voltage input level from 3 Volts to 240 Volts, for example, other devices, which may never have been intended for irrigation use, may be programmed to interface with the wireless irrigation adapter 210 and operate one or more irrigation valves 110. For example, industrial controllers, designed for factory use, such as Personal Computers, Programmable Logic Controllers (PLCs), motor sequencers, lighting timers, Air Conditioning Thermostats, as well as other controllers, sequencers and switching devices, may be adapted to perform the irrigation scheduling tasks typically performed by the irrigation controller 102. Thus, these devices may be coupled to provide control signals to the wireless irrigation adapter 210 that indicate when one or more valves should be activated. Accordingly, any reference to a pre-existing irrigation controller 102 should be interpreted to include not only specially designed irrigation controllers, but also any other device that may be utilized to control irrigation schedules.

In embodiments where the wireless irrigation adapter 210 is coupled to a controller that doesn't output 24VAC control signals, a separate 24VAC power source may be coupled to the wireless irrigation adapter 210. In one embodiment, a 24VAC signal is supplied by a step-down transformer coupled to a 110 VAC power outlet, for example. In other embodiments, the wireless irrigation adapter 210 may be configured to operate using various other power supply voltages, either DC or AC.

Figure 2:
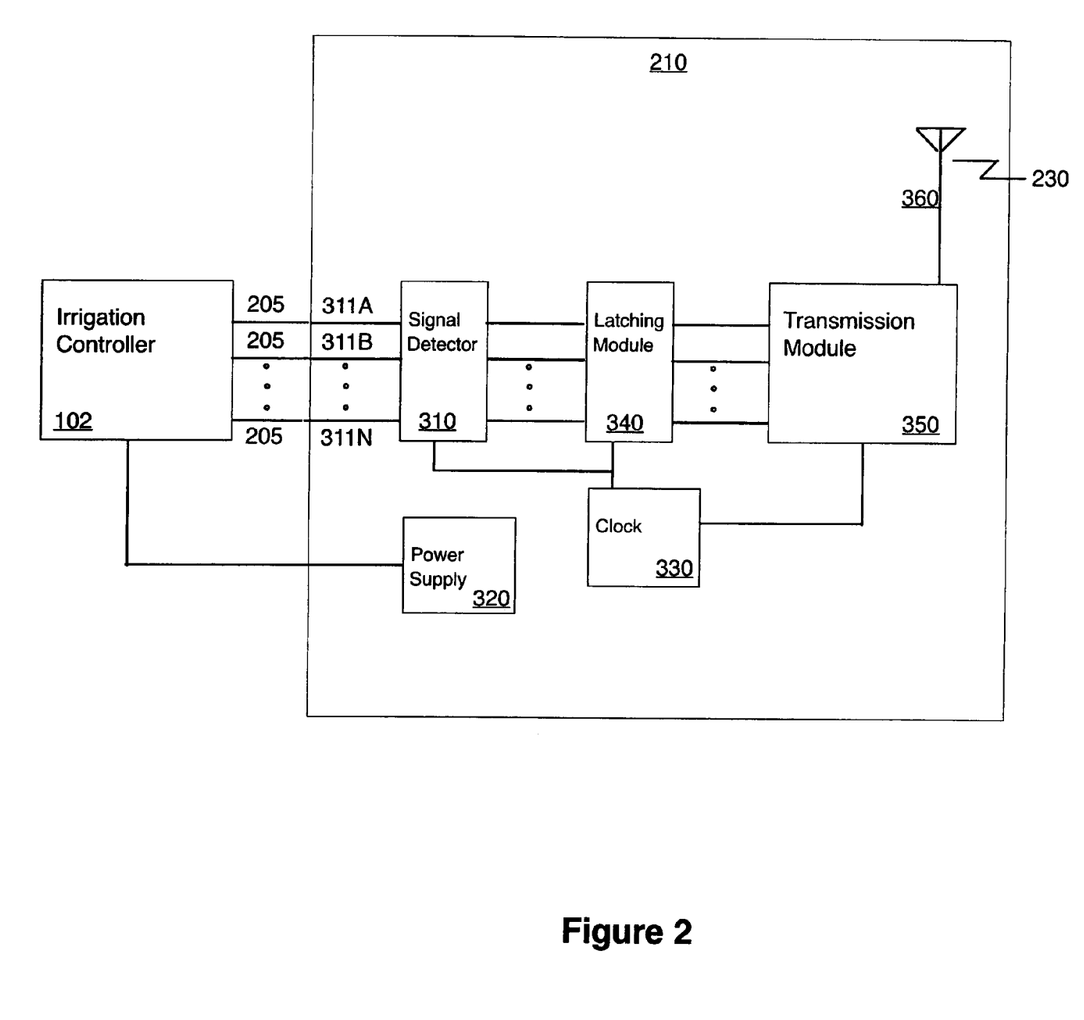
FIG. 2 is a block diagram illustrating components of the exemplary wireless irrigation adapter of FIG. 1.

FIG. 2 is a block diagram illustrating components of the exemplary wireless irrigation adapter 210 of FIG. 1. In the example of FIG. 2, the irrigation controller 102 comprises a commercially available multi-zone controller. The control signals are transmitted to the irrigation adapter 210 via wires 205, as noted above with regard to FIG. 1. The exemplary wireless irrigation adapter 210 comprises a signal detector 310 that detects the control signal on respective of the control lines. As noted above with respect to FIG. 1, currently available irrigation controllers 102 typically output a 24VAC signal in order to activate the irrigation valves 110. In this embodiment, the signal detector 310 is configured to detect the presence of a 24VAC signal on each its input lines 311A, 311B, 311N. Accordingly, the signal detector 310 determines which of the wires 205 currently carry a 24VAC signal and, accordingly, determine if any of the valves should be activated. In other embodiments, irrigation controllers provide different output voltages. The signal detector 310 may be configured to detect the presence of any electrical signal on the input lines 311A, 311B, 311C, such as Normally-Open or Normally-Closed switch-contacts, wired in series with any detectable voltage source, that may be output by non-irrigation-specific devices, e.g., PLCs, SPA-timers and air-conditioning thermostats, etc.

The exemplary wireless irrigation adapter 210 also comprises a power supply 320 that provides power to the electrical components of the wireless irrigation adapter 210. In one embodiment, the power supply 320 is electrically coupled to the irrigation controller 102, and is provided with an output voltage from the irrigation controller 102. For example, in one embodiment the irrigation controller 102 provides the power supply with a 24VAC signal. In other embodiments, the irrigation controller 102 may provide other voltage levels to the power supply 320. In one embodiment, the power supply 320 may be directly connected to a power outlet, such as a 110 VAC outlet. In other embodiments, the power supply 320 is coupled to one or more alternative power sources, such as a solar-cell. In one embodiment, the power supply 320 transforms and imports an input signal, such as a 24VAC signal, to an output DC signal that may be usable by the electronic components within the wireless irrigation adapter 210, such as a 3V or 5V DC signal.

In one embodiment, the wireless irrigation adapter 210 continuously transmits the wireless control signal 230. In other embodiments, the wireless irrigation adapter 210 may be configured to only occasionally, intermittently or periodically transmit the wireless control signal 230, thereby reducing a power consumption of the wireless irrigation adapter 210 and reducing the congestion of transmitted radio frequency signals. An intermittently transmitted control signal 230 may be advantageous in embodiments where batteries supply power to the wireless irrigation adapter 210 or when reduction of RF signal congestion is necessary or important. The exemplary wireless irrigation adapter 210 is described including circuitry for periodically transmitting the control signal 230. However, those of skill in the art will recognize that the irrigation adapter 210 may be modified to constantly transmit the wireless control signal 230.

In the embodiment of FIG. 2, a clock 330 is used to determine when the control signal 230 should be transmitted. In one embodiment, the clock 330 is an asymmetric clock that generates clock signals that define transmit and sleep phases, where the transmit phase has a transmit period and the sleep phase has a sleep period. In one embodiment, each of the clock 330 cycles includes both a transmit period and a sleep period, where the clock signal indicates a transmit phase when high and a sleep phase when low, for example. In another embodiment, separate clock cycles from the clock 330 correspond with each of the transmit and sleep phases. In other embodiments, the clock 330 may operate in any suitable manner that allows distinction between the transmit phase and the sleep phase.

In one embodiment, during the transmit phase the electronic circuitry of the wireless irrigation adapter 210 draws power from the power supply 320 and transmits the control signal 230, while in the sleep phase at least some of the components of the wireless irrigation adapter 210 are disabled are placed in low power modes. For example, during the sleep phase, the latch module 340 and transmission module (described in further detail below) may be disabled or placed in low power modes. In one embodiment, the transmit period is shorter than the sleep period. For example, the sleep period may be a factor of 2, 3, 4, 5, 10, 20, or 50 times, for example, longer than the transmit period. In one embodiment, the transmit phase has a 25% duty-cycle, wherein some of the circuitry of the wireless irrigation adapter 210 is disabled or placed in low power modes.

The exemplary wireless irrigation adapter 210 comprises a latch module 340 configured to hold the outputs from the signal detector 310 during the transmit phase. In the embodiment of FIG. 2, the latch module 340 receives the output signals from the signal detector 310 and the clock output from the clock 330. In one embodiment the latch module 340 comprises a digital latch. In other embodiments, the latch module 340 comprises any suitable device that is capable of holding at least one digital signal and providing the at least one digital signal on an output.

A transmission module 350 is configured to receive the latched data signal, or signals, from the latch module 340 and transmit the signal during the transmit phase. In one embodiment, the transmission module 350 receives the output from the latch module 340 only during the transmit phase, as indicated by the clock signal generated by the clock 330. In one embodiment, the transmission module transmits a UHF RF signal that is recognizable by the wireless receivers 220 (FIG. 1). However, the transmission module 350 may be configured to transmit any other protocol of wireless signal that is suitable for transmission and reception in the environment of an irrigation system. In one embodiment, the transmission module 350 combines the latched signals received from the latch module 340 into a serial digital data signal. In other embodiments, the transmission module 350 transmits a wireless control signal 230 comprising multiple RF signals having different frequencies, phases, and/or power levels, for example. In one embodiment, the transmission module is coupled to an antenna 360 that transmits the control signals 230.

The specific combination of components illustrated in wireless irrigation adapter 210 of FIG. 2 are exemplary. Those of skill in the art will recognize that various configurations and arrangements of components may be used in performing the same functions as performed by the exemplary wireless irrigation adapter 210. For example, fewer or more components, in various other configurations, may be used in the wireless irrigation adapter 210.

Figure 3:
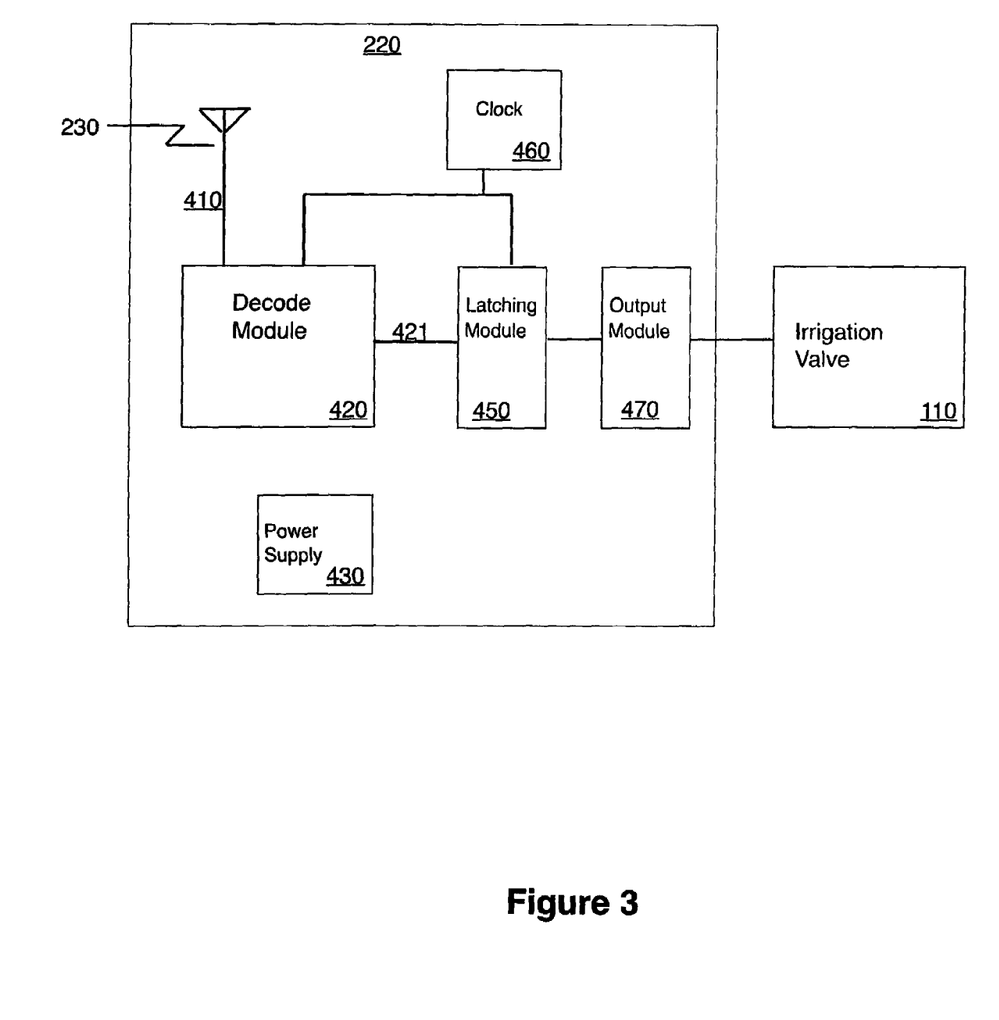
FIG. 3 is a block diagram illustrating components of the exemplary wireless receiver of FIG. 1.

FIG. 3 is a block diagram illustrating components of the exemplary wireless receiver 220. As indicated above with respect to FIG. 1, the wireless receiver 220 may be coupled to the irrigation valve 110 in order to control operation of the irrigation valve 110 in accordance with a watering schedule stored at the irrigation controller 102. In the embodiment of FIG. 3, the wireless receiver 220 comprises an antenna 410, a decode module 420, a power supply 430, a latch module 450, a clock 460, and an output module 470. Each of these components will be described in further detail below.

The antenna 410 is advantageously tuned to receive the wireless control signal 230 that is radiated from the antenna 360 of the wireless irrigation adapter 210 (FIG. 2). The received control signal 230 is then transmitted to a decode module 420 that converts the signal to a usable digital output. Various methods of transmitting and receiving digital signals are known in the art. Any of these methods suitable for transmission of a data signal are usable with the systems and methods described herein.

A power supply 430 comprises one or more voltage sources that are electrically coupled to the components in the wireless receiver 220 and provide power for operation of those components. Because the wireless receivers 220 are co-located with the irrigation valves 110, the power supply 430 typically comprises one or more batteries. For example, in one embodiment the power supply 430 comprises a 9 V battery. In another embodiment, the power supply 430 comprises two 9 V batteries. In other embodiments, the power supply 430 may be coupled to a grid power supply, such as through a standard 110 VAC electrical outlet, or the power supply 430 may be connected to one or more solar power sources, for example. In one embodiment, the power supply comprises a 5 V regulator circuit configured to convert a voltage received from a 9 V battery, for example, to a 5 V signal that is usable by the electric components of the wireless irrigation adapter 210. The regulator circuit may be also reduce noise that could adversely affect proper operation of the circuitry within the wireless irrigation adapter 210. In other embodiments, a voltage regulator may convert an input voltage to a 3 V signal, or any other voltage level that is usable by the electric components in the wireless irrigation adapter 210.

In the exemplary embodiment of FIG. 3, a decode module 420 outputs a decoded control signal 421 to the latch module 450 that is configured to store the decoded control signal 230 for a predetermined period of time. A clock 460 is configured to provide a clock signal to the decode module 420 and the latch module 450. In one embodiment, the wireless receiver 220 has two modes of operation, a listen mode and a sleep mode. During the listen mode, the components of the wireless receiver 220 are actively listening for wireless control signals 230. During the sleep mode, at least some of the components of the wireless receiver 220 are disabled or in low-power states. For example, during the sleep mode, the decode module 420 may be disabled or placed in a low-power state. Thus, the power consumption of the wireless receiver 220 may be reduced when compared to a wireless receiver 220 that is always on.

In one embodiment, the clock 460 generates an asynchronous clock signal that indicates when the wireless receiver 220 is in the listen and sleep modes. In one embodiment, the clock 460 generates alternating pulses that correspond to the sleep and listen modes, respectively, where a duration of the sleep pulse is different than a duration of the listen pulse. For example, the wireless receiver 220 may be in the sleep mode for a time period that is much larger than the time period the wireless receiver 220 is in the listen mode. In another embodiment, a single clock cycle comprising a combination of a low output followed by a high output, represents both the sleep and listen modes. For example, when the clock signal is low, the wireless receiver 220 may be in a sleep mode and when the clock signal is high, the wireless receiver 220 may be in a listen mode. Other clock configurations that provide an indication of alternating listen and sleep modes having different durations are also possible.

In one embodiment, the latch module 450 advantageously holds the decoded control signal 421 received during the listen mode for a predetermined failsafe period, which may be longer than multiple listen and sleep modes. In this embodiment, the state of the latch will remain unchanged during the failsafe period so long as no new decoded control signal 421 is received at the latch. When another decoded control signal 421 is provided to the latch module 450, the content of the latch is updated and the failsafe period is reset. Thus, in order to maintain an activated state of a valve 110, a control signal indicating that the valve 110 should remain activated must be received by the wireless receiver 220 before the end of the failsafe period. In one embodiment, the default position of the valves 110 is deactivated. In this embodiment, if an activation control signal has not been received by the wireless receiver 220 during the failsafe period, the valve returns to the default, deactivated position. In other embodiments, the default position may be activate so that in order to maintain the valve in the deactivated position, deactivate control signals must not be separated by more than the failsafe period.

An output module 470 is configured to receive the decoded control signal stored in the latch module 450 and generate an appropriate signal to control the irrigation valve 110. For example, if the latch module 450 output indicates that an activation signal has been received from the wireless irrigation adapter 210, the output module 470 generates and outputs an appropriate activation signal to the irrigation valve 110, causing the irrigation valve 110 to open. As the wireless receiver 220 enters the sleep mode, the decode module 420 may be disabled, while the latch module 450 and output module 470 remain on. Thus, after receiving an activation signal during a listen mode, the output module 470 may continue to output an activation signal to the valve 110.

In one embodiment, the decoded control signal stored in the latch module 450 is not changed until another control signal 230 is received. For example, if the wireless receiver 220 receives an activation control signal during a first listen mode, the output module 470 generates outputs an appropriate activation signal to the irrigation valve 110 during any remaining portion of the listen mode and the subsequent sleep mode. If during the subsequent listen phase the wireless receiver 220 does not receive a control signal 230, the content of the latch module 450 is not updated and the state of the valve 110 is maintained until the failsafe period lapses. As noted above, the failsafe period may include multiple sleep and listen modes, such as 2, 5, 10, 15, 20, 30, 40, 50, 75, or 100 sleep and listen modes. Thus, after providing a control signal to the wireless receiver 220, the state of the valve may be maintained for a long periods of time before another control signal is necessary to maintain the desired state.

In one embodiment, the wireless receiver 220 does not have sleep and listen modes and the wireless receiver 220 continuously listens for received control signal 230. Because continuous operation of components of the wireless receiver 220 uses more power than a wireless receiver 220 that only intermittently is in a listen mode, a continuously powered wireless receiver may be most advantageous in an embodiment where an AC power source is available to he wireless receiver 220.

Figure 4:
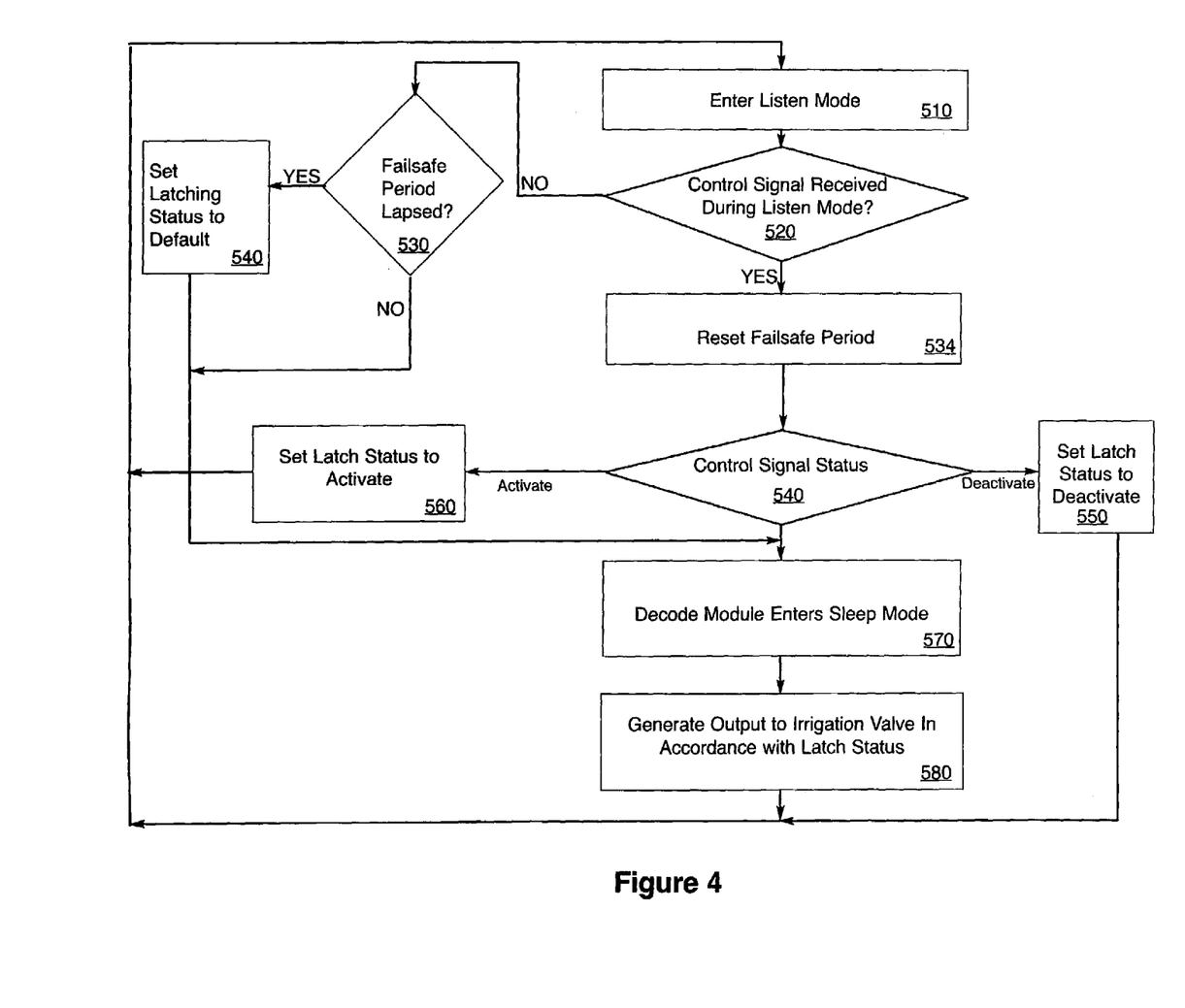
FIG. 4 is a flowchart illustrating an exemplary method of operation for the wireless receiver of FIG. 1.

FIG. 4 is a flowchart illustrating an exemplary method of operation for the wireless receiver 220. As noted above, in one embodiment the wireless receiver 220 operates in two modes, a listen mode and a sleep mode. In one embodiment, the mode of the wireless receiver 220 is determined by a clock signal, such as the asynchronous clock signal generated by clock 460. In other embodiments, other circuitry, such as a counter/decoder or timer, for example, may be used to determine the mode of the wireless receiver 220. As illustrated in FIG. 4, in a step 510, wireless receiver 220 enters the listen mode and in a step 570, the wireless receiver enters the sleep mode. The amount of time spent in each of the listen and sleep modes are not specified in the flowchart of FIG. 4, but may be adjusted, such as at a factory that manufactures the wireless receiver, to the particular application in which the wireless receiver 220 is used. In one embodiment, the sleep mode is much longer than the listen mode, providing a wireless receiver with reduced power consumption when compared to an always-on wireless receiver.

In a block 510, the wireless receiver 220 enters the listen mode. In one embodiment, a clock signal is received by the wireless receiver and is used to determine when the wireless receiver 220 should be in the listen mode. In the listen mode, the components of the wireless receiver 220 that receive wireless control signals 230 are activated and listening for the control signals 230.

In a block 520, the wireless receiver 220 determines if a control signal 230 has been received. If a control signal 230 is not detected during the listen mode, the method continues to a decision block 530. If a control signal 230 is detected during the listen mode, the method continues to a block 534.

In the decision block 530, the latch module 450, for example, determines if the failsafe period has lapsed. If the failsafe period has lapsed, the method continues to a block 532 wherein the latch module 450 is update with data indicating a default status for the valve. For example, the default status may be either to maintain the irrigation valve 110 in its current state, e.g., activated or deactivated, to activate the irrigation valve 110, or to deactivate the irrigation valve 110. In an embodiment where loss of signal is likely and water conservation is important, the default status may be to deactivate the irrigation valve 110 when the failsafe period has lapsed. Accordingly, after the irrigation valve 110 has been activated by the reception of an activation control signal, if another activation control signal is not received within the failsafe period, the valve 110 will be disabled. After setting the latch status to the default value in block 532, the method continues to a block 570 where the wireless receiver enters the sleep mode. As noted above, the timing for entering the listen and sleep modes may be determined by a clock that is configured to alternate the wireless receiver 220 between the two modes according to predetermined time periods.

If it is determined in decision block 530 that the failsafe period has not lapsed, the method continues to block 570 where the wireless receiver 220 enters the sleep mode. In the embodiment of FIG. 4, if the failsafe period has not lapsed, the status information stored in the latch module 450 will not be changed and the valve 110 will be maintain in its current state.

If a control signal has been received by the wireless receiver 220 in block 520, the method continues to a block 534 where the failsafe period is reset. Thus, the time period in which another control signal 230 must be received in order to update the valve status stored in the latch module 450 is restarted. In one embodiment, the failsafe period comprises about 17 listen and sleep cycles.

Continuing to a block 540, a status indicator in the wireless control signal 230 is determined. In one embodiment, a decode module 420 is used to decode the received control signal 230 and determine a status indicator contained in the control signal 230. In one embodiment, the status indicator indicates whether the irrigation valve 110 should be activated or deactivated. In other embodiments, the control signal may also indicate the current status for other irrigation valves. Accordingly, the decode module 420 may be configured to decode status information related to other irrigation valves and select the appropriate status information for the irrigation valve 110.

If the status indicator in the received control signal 230 indicates that the valve 110 should be activated, the method continues to a block 530 where the status information stored in the latch module 450 is updated to indicate that an activate signal has been received. Conversely, if the received control signal 230 indicates that the valve 110 should be deactivated, the method continues to block 550 where the status information stored in the latch module 450 is updated to indicate that a deactivate signal has been received. Thus, in either case, the latch module 450 contains the desired current status of the irrigation valve 110. As noted above, the status contained in the latch module 450 will be applied to the irrigation valve 110 not only during any remaining time in the listen mode, but also through the duration of the sleep mode.

After determining the content of the received control signal 230 and setting the status information in the latch module 450, the method continues to a block 570 where the wireless receiver 220 enters the sleep mode. As discussed above, during the sleep mode, certain circuitry of the wireless receiver 220 may be disabled or set to low-power modes.

Moving to a block 580, the non-sleeping circuitry of the wireless receiver 220 outputs a signal to the irrigation valve 110 according to the status information in the latch module 450. For example, if the status information in the latch module 450 is set to activate the irrigation valve 110, the wireless receiver outputs a signal having a voltage level, current level, and polarity for a period of time that causes the irrigation valve 110 to activate. Alternatively, if the status information in the latch module 450 is set to deactivate the irrigation valve 110, the wireless receiver outputs a signal having a voltage level, current level, and polarity for a period of time that causes the irrigation valve 110 to deactivate.

In one embodiment, block 580 occurs prior to block 570. In this embodiment, the wireless receiver 220 outputs a signal to the irrigation valve 110 according to the status information in the latch module 450 prior to entering the sleep mode.

After completing the sleep mode, as indicated by the clock 460, the method returns to block 510, returning to the list en mode.

Figure 5:
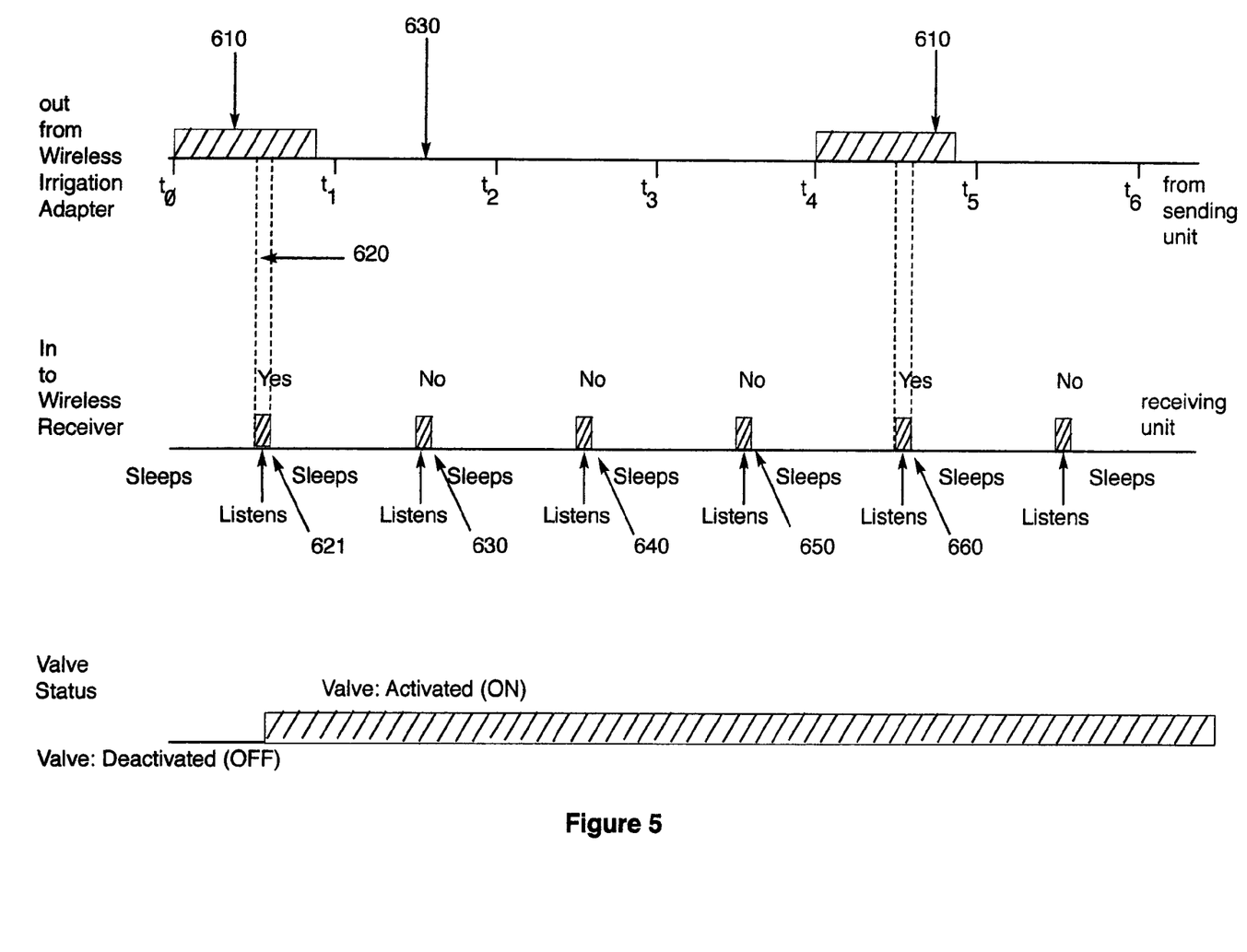
FIG. 5 is a timing diagram illustrating an exemplary output signal from the wireless irrigation adapter and of the signal received by an exemplary irrigation valve.

FIG. 5 is a timing diagram illustrating an exemplary output signal from the wireless irrigation adapter 210 and of a signal received by an exemplary irrigation valve 110 from a wireless receiver 220. The timing diagram is divided into six time periods to $t_0$ $t_6$ In one embodiment, each of the time periods are equivalent, such as 1, 10, 20, 30, 40, or 50 seconds, or 1, 2, 3, 4, 5, 10, 20, 30 or 60 minutes, for example. In other embodiments, the time periods may be any other amount of time. As illustrated in FIG. 5, the wireless irrigation adapter 210 outputs an activation control signal during two time periods 610. As noted above with respect to FIG. 2, the wireless irrigation adapter 210 may be configured to periodically transmit the wireless control signal 230. For example, the output of the wireless irrigation adapter 210 may have a 25% duty cycle, wherein the control signal 230 is transmitted only 25% of the time. In one embodiment, a length of time for each transmission of the control signal 230 is set to a time period that is longer than a combined sleep and listen mode of the wireless receiver 220. Thus, no matter when the control signal 230 is transmitted, the wireless receiver 220 will receive the control signal 230, assuming the control signal 230 is not damaged, obstructed or otherwise prevented from reaching the wireless receiver 220.

In the embodiment of FIG. 5, the wireless receiver 220 repeatedly changes between listen and sleep modes. In the embodiment of FIG. 5, the listen mode is about ⅕ the duration of the sleep mode. Accordingly, at least some of the components of the wireless receiver 220 are deactivated, or in a low-power mode, most of the time. In other embodiments, the ratio of time distributed to the listen and sleep modes are varied according to the particular application. During the time 620, the wireless receiver 220 receives the control signal 230 transmitted by the wireless irrigation adapter 210. In the embodiment of FIG. 5, the control signal 610 indicates that the valve 110 should be activated. Upon receiving the control signal 610, the wireless receiver 220 causes the irrigation valve 110 to be activated.

Advantageously, at time 621 when the wireless receiver 220 returns to the sleep mode, the valve 110 remains in the activated state through the use of a latch module, such as described above with respect to FIG. 3. In one embodiment, the latch module 450 comprises one or more latching mechanisms, such as registers, one shots, latches, set and hold circuits, or flip-flops, for example. In one embodiment, the latch module 450 not only holds the state of the valve during the sleep mode, but for a predetermined time period that comprises multiple sleep and listen modes. For example, the latch module 450 may be configured to hold the valve state in the decoded control signal 421 for 10, 20, 30, 40, 50, or 100, for example, cycles of listen and sleep modes. Thus, if the control signal 230 is interrupted or obstructed after been received during a single listen mode of the wireless receiver 220, the latch module 450 maintains its outputs and, thus, maintains a state of the irrigation valve 110 for the predetermined failsafe period.

In the example of FIG. 5, the latch module 450 is configured to hold the decoded control signal 421 for a failsafe period that is longer than at least three sleep and listen cycles, assuming there is not an additional control signal 230 received. With reference to FIG. 5, during the listen modes 630, 640, and 650, the wireless irrigation adapter 210 is not transmitting the activation control signal 610 and, accordingly, the wireless receiver 220 does not receive a control signal 230. However, due to the use of the latch module 450, the state of the valve remain activated during these periods of non-transmission by the wireless irrigation adapter 210 because the failsafe period is longer than three sleep and listen cycles.

During the listen mode 660, the wireless receiver 220 again receives the activation control signal 610 and, accordingly, latches the decoded control signal 421 into the latch module 450 and resets failsafe period.

Because the wireless irrigation adapter 210 is configured to periodically transmit the wireless control signal 230 only periodically, the use of radio frequency bands, such as the UHF band, may be reduced. Accordingly, in this embodiment, the wireless irrigation adapter 210 does not overuse the radio frequency at which it transmits the wireless control signals 230.

Figure 6:
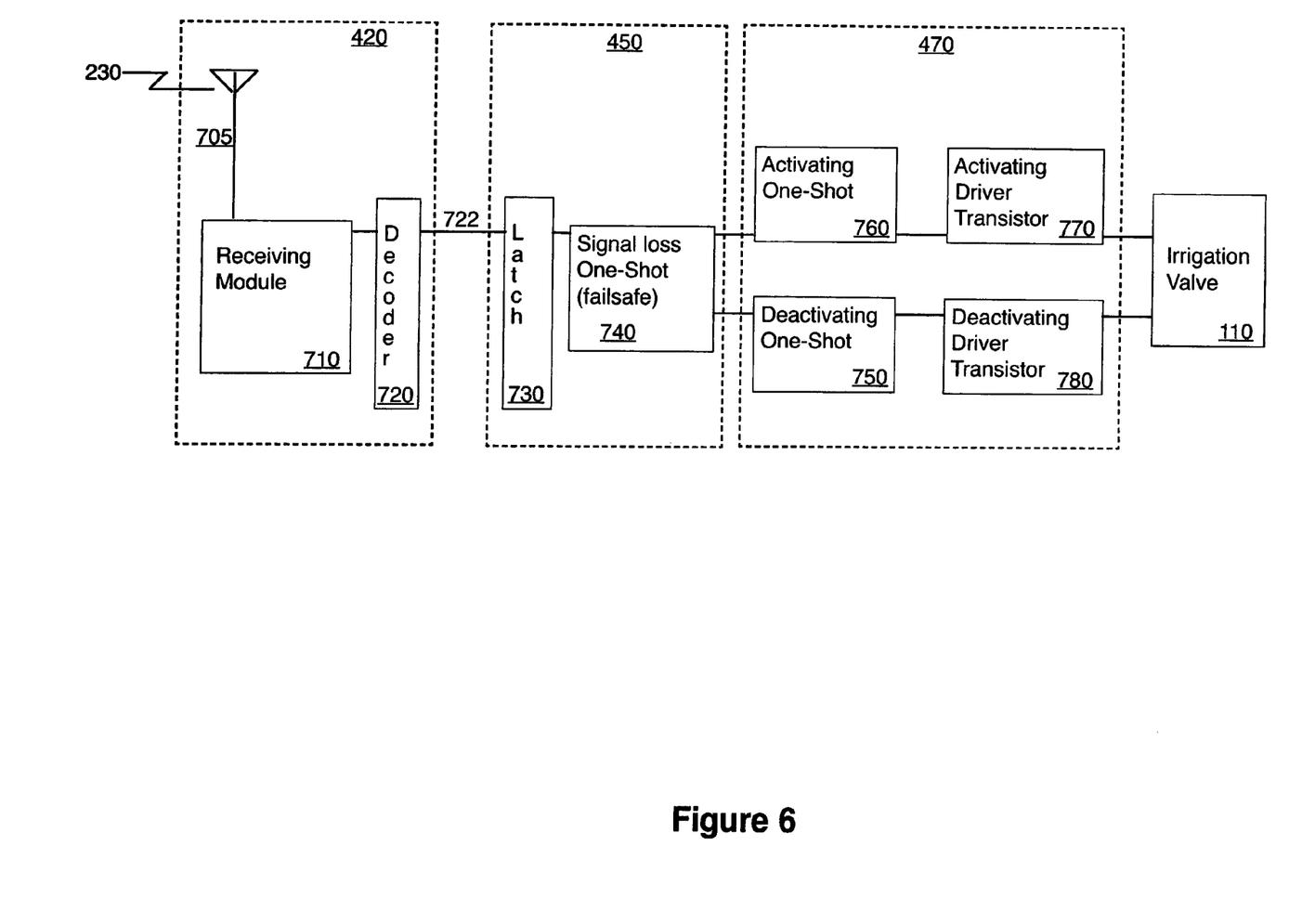
FIG. 6 is a block diagram illustrating exemplary components of the decode module, latch module, and output module of an exemplary wireless receiver.

FIG. 6 is a block diagram illustrating exemplary components of the decode module 420, latch module 450, and output module 470 of FIG. 3. The components illustrated in FIG. 6 are exemplary only and are not intended to limit possible configurations of components in the wireless receiver 220.

In the embodiment of FIG. 6, the decode module 420 comprises a receiving module 710 and a decoder 720. In one embodiment, the receiving module 710 is a digitally coded receiving module that provides a coded output, wherein the output of the receiving module 710 is a unique combination of bits. In one embodiment, when the receiving module 710 does not receive a control signal 230 from the antenna 705, the receiving module does not provide an output signal to the decoder 720. In another embodiment, when the receiving module 710 does not receive a control signal 230 from the antenna 705, a receiving module outputs a signal to the decoder 720 indicating that a control signal has not been received, such as a null output including all zeros. As noted in FIG. 2, the clock 330 controls when the decode module 420 actively listens for wireless control signals 230. During a sleep mode, the receiving module 710 may enter an ultra low power standby mode. The receiving module 710 may be awakened from the sleep mode by the state of, or a transition of a clock signal, indicating the beginning of the listen mode. Because the receiving module 710 requires some time to power on and accurately output any received control signal 230, the duration of the listen mode is advantageously long enough to allow accurate recognition of the control signal 230

In one embodiment, the decoder is trailing edge triggered by the clock signal output from the clock 330, and is configured to decode the output of the receiving module 710 and output the decoded signal to the latch module 450. In one embodiment, the output of the receiving module 710 is a four bit binary code and the decoder 720 converts the 4-bit binary code into a 3-bit decoded output 722.

The latch 730 comprises any circuit, or combination of circuits, that are capable of storing digital data for a predetermined period of time. For example, in one embodiment, the latch 730 stores the decoded output 722 during the sleep mode of the wireless receiver 220. In one embodiment, the decoded output 722 is registered in the latch at the trailing edge of the listen mode clock signal, and the decoded output 722 remains unchanged in the latch 730 until the subsequent trailing edge of the listen mode. When the subsequent listen mode completes, the current decoded output 722 is latched into the latch 730.

In the embodiment of FIG. 6, a signal loss one-shot 740 is configured to maintain the state of the irrigation valve 110 during the failsafe period when a listen mode lapses without receiving a control signal 230. In one embodiment the signal loss one-shot 740 is set to hold a received digital signal for a failsafe period, such as 1, 5, 10, 15, 20, 30, or 60 seconds, for example. In one embodiment, a RC network is used to set the timing of the one-shot 740. Thus, the hold time of the signal loss one-shot 740 may be determined by changing the values of the resistor and capacitor in the corresponding RC network. A digital counter could also be used for this purpose. Those of skill in the art will recognize that various other electrical components alone, and in combination, may be used in order to provide similar functionality.

In the embodiment of FIG. 6, a first output of the signal loss one-shot 740 is electrically coupled to an activation one-shot 760 and a second output of the signal loss one-shot 740 is electrically coupled to a deactivation one-shot 750. In one embodiment, the one-shot 740 comprises a CMOS, resettable, retriggerable, monostable multivibrator with Schmidt triggered inputs. When the signal loss one-shot 740 is within the failsafe period, the first output to the activation one-shot 760 is asserted. After the failsafe period has lapsed, the second output to the deactivation one-shot 750 is asserted. As described in further detail below, the combination of the activation one-shot 760 and the activation driver transistor 770 maintain a state of the irrigation valve 110 during the failsafe period. Likewise, after the failsafe time period has elapsed, the deactivation one-shot 750 and the deactivation driver transistor circuit 780 generate a deactivation signal to the irrigation valve solenoid, thus deactivating the irrigation valve 110.

In embodiments where the valves 110 comprise DC-latching solenoids, the valves 110 may only receive an output from the output module 470 when the state of the valve 220 needs to be changed. Thus, in this embodiment, so long as a control signal 230 indicating that a particular valve 110 should be activated continues to be received by the wireless receiver, the output module 470 is not required to output an electrical signal to the valve 110 in order to maintain its state, after the valve has initially been activated. Similarly, in this embodiment, a single deactivation signal will change the state of the DC-latching solenoid in the valve 110 so that the valve is closed, and remains closed until an activation signal is received. Thus, the use of a DC-latching solenoid may reduce the power requirements and extend the battery life of a wireless receiver.

The combination of the activation one-shot 760 and the activation driver transistor circuit 770 generate an electrical pulse that is sufficient to activate the irrigation valve 110. As noted above, in an advantageous embodiment, the irrigation valve 110 comprises a DC latching solenoid that may be activated by a DC pulse of a first polarity and deactivated by a DC pulse of an opposite polarity. In other embodiments, a DC pulse of varying voltage and/or current levels may be used to activate and deactivate the irrigation valve 110. Advantageously, DC latching solenoid valves do not draw quiescent current while in the activated or deactivated states that follow the control signal pulse. They only draw current while they are being switched from the activate mode to the deactivated mode or back again.

In one embodiment, the activation one-shot 760 comprises an RC circuit with components selected to create a pulse output of about 100 ms. In other embodiments, the pulse may be longer or shorter than 100 ms. In an advantageous embodiment, the pulse length is selected to be long enough to reliably activate the irrigation valve 110, but not long enough to damage the irrigation valve 110. Because the irrigation valve 110 may be activated by a short pulse, the power required to activate the irrigation valve 110 is minimized. In one embodiment, the activation driver transistor 770 comprises circuitry that generates considerable current that is delivered to the coil of the solenoid of the irrigation valve 110 when the activation one-shot 760 outputs a pulse. In one embodiment, the activation driver transistor 770 comprises one or more MOSFETS.

The deactivation one-shot 750 and the deactivation driver transistor 780 operate in a similar manner to the activation one-shot 760 and the activation driver transistor 770, respectively. When an input signal to the deactivation one-shot 750 is asserted, the deactivation one-shot generates an output pulse for a predetermined time period, such as 100 ms, for example. When this output pulse is received by the activating driver transistor 770, the deactivating driver transistor 780 generates and outputs a high current DC pulse to the coil of the irrigation valve 110, causing the irrigation valve 110 to deactivate.

In one embodiment, the activation one-shot 760 and the activation driver transistor 770 are powered by a first battery, such as a 9 V battery, while the deactivation one-shot 760 and be the activation driver transistor 780 are powered by a second battery such as a second 9 V battery.

In the embodiment of FIG. 6, the decode module 420, latch module 450, and output module 470 are shown controlling only a single irrigation valve 110. However, in another embodiment, the received control signal 230 may include status information for multiple irrigation valves 110. In such an embodiment, the decoder 720 may be configured to output a decoded digital signal corresponding with each of the irrigation valves 110 and the latch module 340 may contain multiple sets of one-shots 740, 750 and driver transistors 770, 780 for each irrigation valve 110.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A wireless receiver coupled to a irrigation solenoid valve, the wireless receiver comprising:
   means for activating the irrigation solenoid valve in response to receiving a wireless control signal indicating a desired state of the irrigation solenoid valve, wherein the means for activating comprises:
   a decode module for receiving the wireless control signal;
   a clock configured to generate electrical signals indicative of a sleep mode and a listen mode, wherein during the sleep mode, at least the decode module enters a very low power mode;
   a latch module for maintaining the desired state received in the wireless control signal for a predetermined time, wherein the predetermined time is longer than a duration of the listen mode;
   an output module for outputting an electrical signal to the irrigation valve in accordance with the desired state stored in the latch module for the predetermined time; and
   means for deactivating the irrigation solenoid valve if the wireless control signal is not again detected during a pre-determined time interval after being initially received by the activating means.

2. The wireless receiver of claim 1, wherein the latch module comprises one or more monostable multivibrators.

3. The wireless receiver of claim 1, wherein the predetermined time is longer than about three listen modes and sleep modes.

4. The wireless receiver of claim 1, wherein the predetermined time is longer than ten listen modes and sleep modes.

5. The wireless receiver of claim 1, wherein the low power mode comprises disabling the decoder.

6. The wireless receiver of claim 1, wherein the clock comprises an asynchronous clock.

* * * * *

UNITED STATES PATENT AND TRADEMARK OFFICE
CERTIFICATE OF CORRECTION

PATENT NO. : 7,286,904 B2  Page 1 of 1
APPLICATION NO. : 11/209590
DATED : October 23, 2007
INVENTOR(S) : Glen Gary Graham It is certified that error appears in the above-identified patent and that said Letters Patent is hereby corrected as shown below:

Column 12

Line 41, Please delete "to $t_0$" and insert therefor -- $t_0$ to --.

Signed and Sealed this

Third Day of June, 2008

JON W. DUDAS
*Director of the United States Patent and Trademark Office*